United States Patent
Jadwin et al.

(10) Patent No.: US 6,610,451 B2
(45) Date of Patent: Aug. 26, 2003

(54) DEVELOPMENT SYSTEMS FOR MAGNETIC TONERS HAVING REDUCED MAGNETIC LOADINGS

(75) Inventors: Thomas A. Jadwin, Rochester, NY (US); John F. Crichton, Honeoye Falls, NY (US); Robert D. Fields, Rochester, NY (US); Eric C. Stelter, Pittsford, NY (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/747,764

(22) Filed: Dec. 26, 2000

(65) Prior Publication Data

US 2002/0115006 A1 Aug. 22, 2002

(51) Int. Cl.$^7$ .............................................. G03G 9/083
(52) U.S. Cl. ............................... 430/106.1; 430/108.6; 430/108.7
(58) Field of Search ........................ 430/108.6, 116.1, 430/110.3, 111.41, 903, 106.1, 108.1

(56) References Cited

U.S. PATENT DOCUMENTS

| | | | |
|---|---|---|---|
| 3,716,630 A | 2/1973 | Shirk .......................... 423/594 |
| 3,893,935 A | 7/1975 | Jadwin et al. .............. 232/62.1 |
| 3,941,898 A | 3/1976 | Sadamatsu et al. ........... 427/18 |
| 3,983,992 A | 10/1976 | Gray et al. .................. 198/381 |
| 4,076,857 A | 2/1978 | Kasper et al. ................. 427/18 |
| 4,385,823 A | 5/1983 | Kasper et al. ............... 355/3 R |
| 4,473,029 A | 9/1984 | Fritz et al. ................... 118/657 |
| 4,546,060 A | 10/1985 | Miskinis et al. ............. 430/108 |
| 4,556,624 A | 12/1985 | Gruber et al. ............... 430/110 |
| 4,578,338 A | 3/1986 | Gruber et al. ............... 430/120 |
| 4,609,603 A | 9/1986 | Knapp et al. .................. 430/39 |
| 4,634,649 A | 1/1987 | Knapp et al. ................ 430/109 |
| 4,690,603 A | 9/1987 | Graner ......................... 430/39 |
| 4,695,524 A | 9/1987 | Knapp et al. .................. 430/32 |
| 4,758,493 A | 7/1988 | Young et al. ................ 430/122 |
| 4,859,550 A | 8/1989 | Gruber et al. .................. 430/39 |
| 4,883,736 A | 11/1989 | Hoffend et al. ............. 430/110 |
| RE33,172 E | 2/1990 | Gruber et al. .................. 430/39 |
| 5,057,392 A | 10/1991 | McCabe et al. ............. 430/109 |
| 5,089,547 A | 2/1992 | McCabe et al. ............. 524/262 |
| 5,102,755 A | 4/1992 | Ruhland et al. ............... 430/39 |
| 5,102,765 A | 4/1992 | McCabe et al. ............. 430/110 |
| 5,112,715 A | 5/1992 | DeMejo et al. .............. 430/109 |
| 5,124,217 A | 6/1992 | Gruber et al. .................. 430/39 |
| 5,124,271 A | 6/1992 | Havemann ..................... 430/39 |
| 5,147,747 A | 9/1992 | Wilson et al. ............... 430/109 |
| 5,344,737 A | 9/1994 | Berkes et al. ................ 430/110 |
| 5,358,814 A | 10/1994 | Osterhoudt et al. ....... 430/106.6 |
| 5,358,815 A | 10/1994 | Wilson et al. ........... 430/106.6 |
| 5,358,816 A | 10/1994 | Wilson et al. ........... 430/106.6 |
| 5,358,817 A | 10/1994 | Wilson et al. ........... 430/106.6 |
| 5,358,818 A | 10/1994 | Wilson et al. ........... 430/106.6 |
| 5,389,482 A | 2/1995 | Okano et al. ............. 430/160.6 |
| 5,439,772 A | 8/1995 | Takagi et al. ............. 430/106.6 |
| 5,482,805 A | 1/1996 | Grande et al. .............. 430/106 |
| 5,486,443 A | 1/1996 | Grande et al. .............. 430/106 |
| 5,510,221 A | 4/1996 | Matalevich et al. ...... 430/106.6 |
| 5,552,252 A | 9/1996 | Lundy et al. .................. 430/39 |
| 5,780,190 A | 7/1998 | Listigovers et al. ........... 430/39 |
| 5,780,195 A | 7/1998 | Nava ........................... 430/110 |
| 5,914,209 A * | 6/1999 | Grushkin .................. 430/106.6 |
| 5,952,138 A * | 9/1999 | Kuwashima et al. .......... 430/39 |
| 5,976,748 A * | 11/1999 | Arai et al. ................ 430/106.6 |
| 5,998,076 A | 12/1999 | Mahabadi et al. ........ 430/106.6 |
| 6,075,965 A | 6/2000 | Tombs et al. ................ 399/308 |
| 6,083,654 A | 7/2000 | Lin ............................. 430/110 |
| 6,228,549 B1 * | 5/2001 | Lambert et al. ......... 430/106.6 |

FOREIGN PATENT DOCUMENTS

| | | |
|---|---|---|
| EP | 1 501 065 | 7/1976 |
| EP | 0 003 905 | 9/1979 |

* cited by examiner

Primary Examiner—John Goodrow

(57) ABSTRACT

Development systems and methods for developing using magnetic toner are disclosed. The present invention further discloses developers used in development systems as well as the toner used in developer for magnetic ink character recognition printing. With respect to the development system, a development system is disclosed which includes a supply of dry developer mixture which contains magnetic toner particles and hard magnetic carrier particles. The development system further includes a non-magnetic, cylindrical shell for transporting the developer between the supply and the development zone, wherein the shell can be rotatable or stationary. A rotating magnetic core of a preselected magnetic field strength and means for rotating at least the magnetic core to provide for the transport of the toner particles from the shell to an electrostatic image also provided as part of the development system. A method for developing electrostatic image with magnetic toner is further disclosed, for example, involving the above-described development system. Magnetic toner particles having a low magnetic loading such as on the order of 28% by weight or less, based on the weight of the toner are further described wherein these magnetic toners can include a spacing agent on the surface of the magnetic toner particles. A developer is further disclosed which contains the magnetic toner particles of the present invention with hard magnetic carrier particles. Other developer compositions are also described.

15 Claims, 4 Drawing Sheets

DEVELOPMENT SYSTEMS FOR MAGNETIC TONERS HAVING REDUCED MAGNETIC LOADINGS

BACKGROUND OF THE INVENTION

The present invention relates to magnetic toners and development systems for magnetic toners.

Magnetic ink character recognition (MICR) printing has been used for many years for checks and negotiable documents as well as for other documents in need of high speed reading and sorting. Various electrophotographic printers which are capable of printing magnetic inks or toners have been available from such sources as IBM and Kodak. Typically, the toner or ink used for MICR applications contains a heavy loading of iron oxide or other magnetic material in order to obtain the required adequate magnetic signal strength for speed reading and sorting and the like. However, MICR toner having such heavy iron oxide loadings can be quite difficult to manufacture since an adequate dispersion of the iron oxide particles in the toner resin, for instance, is hard to achieve and maintain. Furthermore, the resulting image quality from the MICR toner can be degraded relative to images made with normal toner due to decreased toning and fusing efficiencies resulting from the magnetic loadings that are required in the toner.

Accordingly, there is a significant trade off that currently occurs in the MICR technology; namely, a significant amount of magnetic loadings are required in order to achieve the necessary magnetic signal strength and yet this same magnetic loading leads to degraded images or images that have low quality. In order to obtain a higher image quality, the magnetic loading would need to be reduced which would then jeopardize the necessary magnetic signal strength that is required. Accordingly, the industry has simply accepted the lower quality of image in view of the need for the adequate magnetic signal strength that must be present in the MICR toner. Currently, MICR toners in the industry range in iron oxide loadings of up to and even above 50% by weight of the toner. With a loading of over 28% by weight $Fe_3O_4$ in a conventional MICR developer for an IBM 3828 MICR printer (2 component developer using a soft magnetic carrier), the signal strength for the release toner is between 120% and 140% average signal strength of the "on-us" characters as measured on a DOCU-MATE Check Reader. This 120% signal strength is sufficient and required to compensate for character voids and otherwise low density individual image. However, as indicated above, using such a toner, no matter what currently available printer or development system is used, typically leads to image quality which is at best mediocre.

Figure 1:
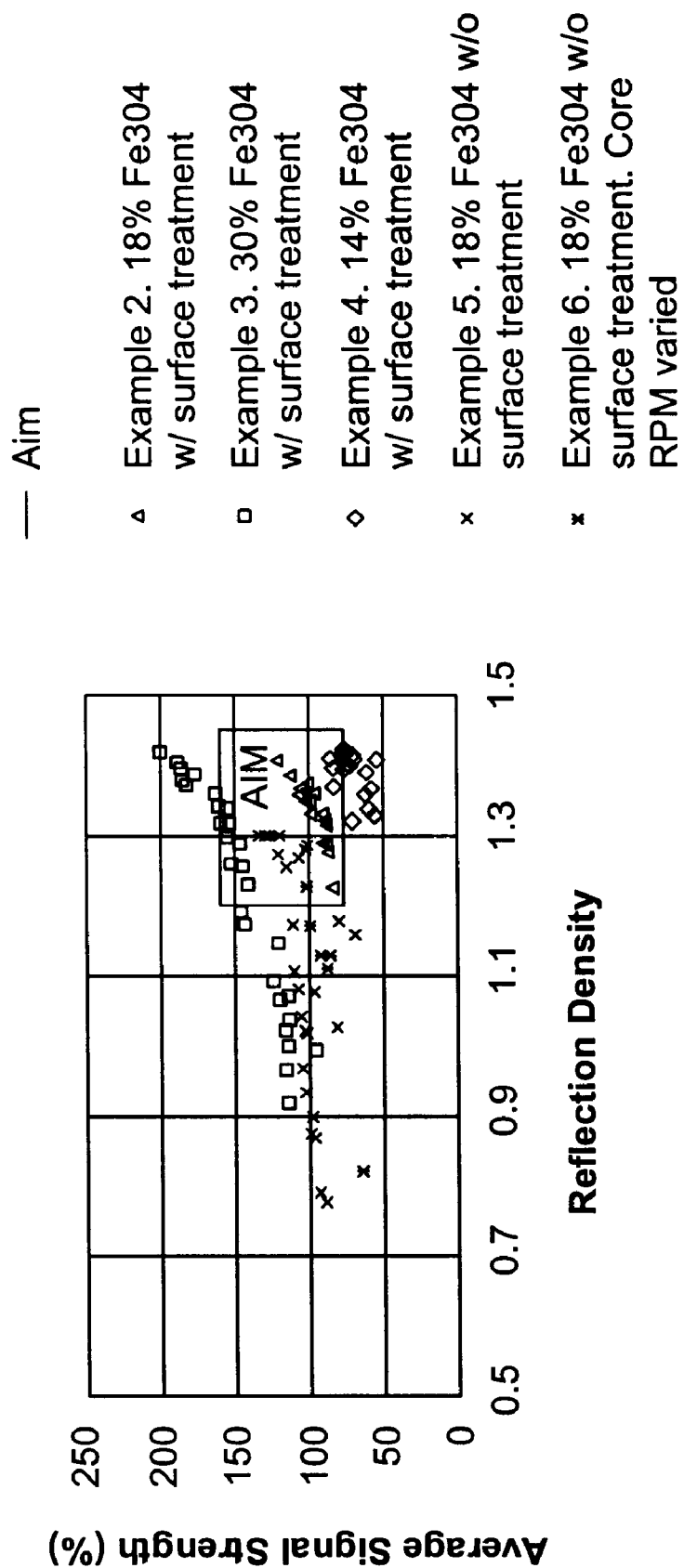
FIG. 1 is a graph plotting the performance of various MICR toners of the present invention printed in a Digisource 9110-like printer.
Figure 2A:
FIGS. 2a, 2b, 3a, and 3b are SEM photographs showing several embodiments of toners of the present invention.
Figure 2B:
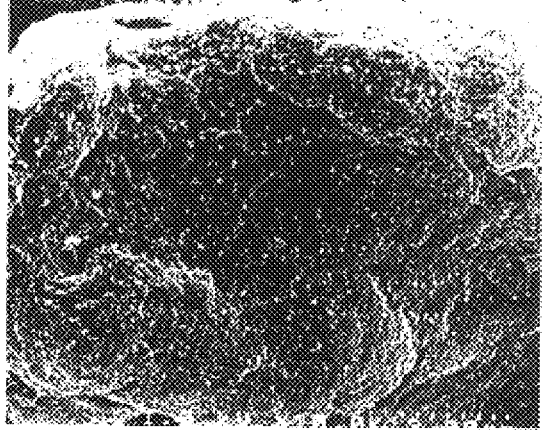
Figure 3A:
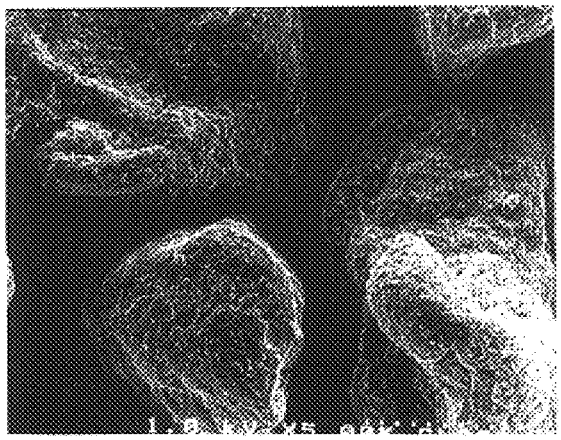
Figure 3B:
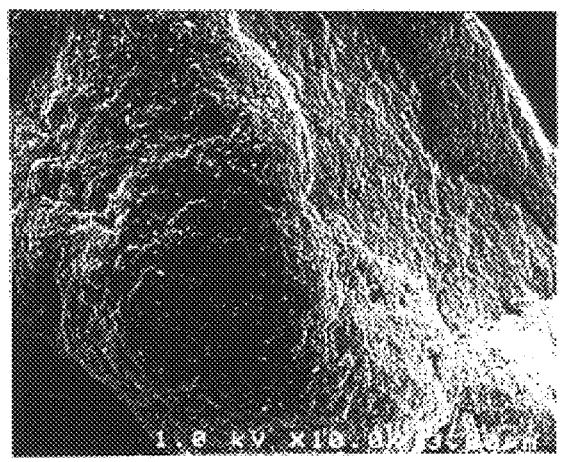

The present invention may be more fully understood with reference to the accompanying figures. The figures are intended to illustrate exemplary embodiments of the present invention without limiting the scope of the invention. The accompanying figures, which are incorporated in and constitute a part of this specification, illustrate several embodiments of the present invention and together with the description, serve to explain the principles of the present invention.

SUMMARY OF THE PRESENT INVENTION

A feature of the present invention is to provide a development system for magnetic toner which provides a printed image having sharp image quality.

Another feature of the present invention is to provide magnetic toner having a reduced magnetic loading and yet achieves the desired magnetic signal strength.

A further feature of the present invention is to provide a magnetic toner which provides a reduced amount of magnetic loading and provides a final image which is above mediocre.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages and in accordance with the purposes of the present invention, as embodied and broadly described herein, the present invention relates to a development system for magnetic toner. The development system includes a supply of dry developer mixture which contains magnetic toner particles and hard magnetic carrier particles. The development system further includes a non-magnetic, cylindrical shell for transporting the developer between the supply and the development zone wherein the shell can be rotatable or stationary. A rotating magnetic core of a pre-selected magnetic field strength and means for rotating at least the magnetic core to provide for the transport of the toner particles from the shell to an electrostatic image are also provided as part of the development system.

The present invention further relates to a method for developing an electrostatic image with a magnetic toner. The method involves developing an electrostatic image member bearing an electrostatic image pattern by moving the image member through a development zone and transporting developer through the development zone in developing relation with the charge pattern of the moving imaging member by rotating an alternating-pole magnetic core of a pre-selected magnetic field strength within an outer non-magnetic shell, which can be rotating or stationary, and controlling the directions and speeds of the core and optionally the shell rotations so that developer flows through the development zone in a direction co-current with the image member movement, wherein an electrographic two-component dry developer composition is preferably used. The dry developer composition contains charged magnetic toner particles and oppositely charged carrier particles. Preferably, the carrier particles are a hard magnetic material exhibiting a coercivity of at least about 300 gauss when magnetically saturated and also exhibit an induced magnetic moment of at least about 20 EMU/gm when in an externally applied field of 1,000 gauss. The carrier particles have a sufficient magnetic moment to prevent the carrier particles from transferring to the electrostatic image.

The present invention also relates to a developer which contains magnetic toner particles and hard magnetic carrier particles. The magnetic toner particles have a low magnetic loading, such as on the order of 28% by weight or less, based on the weight of the toner.

The present invention, in addition, relates to magnetic toner particles and developers containing at least one resin, at least one colorant, at least one charge agent, and at least one magnetic additive, such as iron oxide, wherein the amount of the magnetic additive is considerably lower than conventional magnetic toners, such as on the order of 28% by weight or less, based on the weight of the toner. In a preferred embodiment, the magnetic toner is surface treated with a spacing agent to reduce the attractive forces between the toner particle and carrier particle and yet not interfere with the toner particle transferring to the electrostatic image by electrostatic forces.

The toner of the present invention having a reduced amount of magnetic additives leads to toners which are easier to manufacture, and toners which are easier to fuse into an image. Further, toners with reduced magnetic loadings permit easier separation of the toner particles from the carrier particles and also permits more toner to reach the image which leads to good visual image quality.

It is to be understood that both the foregoing general description and the following detailed description are exemplary and explanatory only and are intended to provide a further explanation of the present invention, as claimed.

DETAILED DESCRIPTION OF THE PRESENT INVENTION

The present invention relates to development systems and methods for developing using magnetic toner. The present invention further relates to the developer used in the development system as well as the toner in the developer.

In more detail, the present invention, in part, relates to a development system. The development system contains a supply of dry developer mixture which includes magnetic toner and hard magnetic carrier particles. A non-magnetic, cylindrical shell which can be a stationary shell or a rotating shell is used for transporting the developer mixture from the supply to the development zone. A magnetic core which includes a plurality of magnetic pole portions is arranged around the core periphery in alternating magnetic polarity relation and which is rotatable on an axis within the non-magnetic, cylindrical shell. Furthermore, means for rotating the core and optionally the shell are present in order to deliver the developer mixture to the development zone wherein the toner of the developer is transferred to the electrostatic image.

The set up of the development system is preferably a digital printer, such as a Heidelberg Digimaster 9110 printer using a development station comprising a non-magnetic, cylindrical shell, a magnetic core, and means for rotating the core and optionally the shell as described, for instance, in detail in U.S. Pat. Nos. 4,473,029 and 4,546,060, both incorporated in their entirety herein by reference. The development systems described in these patents can be adapted for use in the present invention. In more detail, the development systems described in these patents preferably use hard magnetic carrier particles. For instance, the hard magnetic carrier particles can exhibit a coercivity of at least about 300 gauss when magnetically saturated and also exhibit an induced magnetic moment of at least about 20 EMU/gm when in an externally applied field of 1,000 gauss. The magnetic carrier particles can be binder-less carriers or composite carriers. Useful hard magnetic materials include ferrites and gamma ferric oxide. Preferably, the carrier particles are composed of ferrites, which are compounds of magnetic oxides containing iron as a major metallic component. For example, compounds of ferric oxide, $Fe_2O_3$, formed with basic metallic oxides such as those having the general formula $MFeO_2$ or $MFe_2O_4$ wherein M represents a mono- or di-valent metal and the iron is in the oxidation state of +3. Preferred ferrites are those containing barium and/or strontium, such as $BaFe_{12}O_{19}$, $SrFe_{12}O_{19}$, and the magnetic ferrites having the formula $MO.6\ Fe_2O_3$, wherein M is barium, strontium, or lead as disclosed in U.S. Pat. No. 3,716,630 which is incorporated in its entirety by reference herein. The size of the magnetic carrier particles useful in the present invention can vary widely, and preferably have an average particle size of less than 100 microns, and more preferably have an average carrier particle size of from about 5 to about 45 microns.

Since hard magnetic carrier particles are preferred, the hard magnetic carrier particles of the developer become a permanent magnet which is in contrast to other developer particles which are only temporarily magnetized. This situation results in difficulty in removing the toner from the developer particles to allow toning of the electrostatic latent image. This difficulty can be further increased due to the magnetic loading in the magnetic toner as well as the hard magnetic carrier particles being used.

In order to overcome these difficulties, there are several solutions. The most preferred solution of the present invention is to use surface treated magnetic toner particles. The surface treatment with a spacing agent reduces the attraction between the toner particles and the hard magnetic carrier particles to a degree sufficient that the magnetic toner particles are transported by the carrier particles to the development zone where the electrostatic image is present and then the magnetic toner particles leave the carrier particles due at least in part to the sufficient electrostatic forces associated with the charged image. Accordingly, the preferred magnetic toner particles of the present invention permit attachment with the magnetic carrier particles but further permit the stripping of the magnetic toner particles from the hard magnetic carrier particles by the electrostatic and/or mechanical forces and with surface treatment on the magnetic toner particles. In other words, the spacing agent on the surface of the magnetic toner particles, as indicated above, is sufficient to reduce the attraction between the magnetic toner particles and the hard magnetic carrier particles such that the magnetic toner particles can be stripped from the carrier particles by the electrostatic forces associated with the charged image or by mechanical forces.

The preferred spacing agent is silica, such as those commercially available from Degussa, like R-972, or from Wacker, like H2000. Other suitable spacing agents include, but are not limited to, other inorganic oxide particles and the like. Specific examples include, but are not limited to, titania, alumina, zirconia, and other metal oxides; and also polymer beads preferably less than 1 μm in diameter (more preferably about 0.1 μm), such as acrylic polymers, silicone-based polymers, styrenic polymers, fluoropolymers, copolymers thereof, and mixtures thereof.

The amount of the spacing agent on the magnetic toner particles is an amount sufficient to permit the magnetic toner particles to be stripped from the magnetic carrier particles by the electrostatic forces associated with the charged image or by mechanical forces. Preferred amounts of the spacing agent are from about 0.05 to about 1.5 wt %, and more preferably from about 0.1 to about 1.0 wt %, and most preferably from about 0.2 to about 0.6 wt %, based on the weight of the toner.

The spacing agent can be applied onto the surfaces of magnetic toner particles by conventional surface treatment techniques such as, but not limited to, conventional mixing techniques, such as tumbling the toner particles in the presence of the spacing agent. Preferably, the spacing agent is distributed on the surface of the magnetic toner particles. The spacing agent is attached onto the surface of the magnetic toner particles and can be attached by electrostatic forces or physical means or both. With mixing, preferably uniform mixing is preferred and achieved by such mixers as a high energy Henschel-type mixer which is sufficient to keep the spacing agent from agglomerating or at least minimizes agglomeration. Furthermore, when the spacing agent is mixed with the magnetic toner particles in order to achieve distribution on the surface of the magnetic toner particles, the mixture can be sieved to remove any agglomerated spacing agent. Other means to separate agglomerated particles can also be used for purposes of the present invention.

The magnetic toner particles of the present invention preferably contain at least one type of magnetic material such as soft iron oxide ($Fe_3O_4$) which is dispersed in the toner or ink and thus makes the toner or ink ferro-magnetic. The soft iron oxide can be cubic and/or acicular. Other suitable magnetic materials can be present in the toner.

The amount of the magnetic material in the magnetic toner particles of the present invention can be any amount sufficient to preferably meet commercial needs, such as providing a signal strength for the imaged toners for an IBM 3828 MICR printer of from about 120% to about 140% average signal strength of the "on-us" characters as measured on a DOCU-MATE Check Reader. Depending on the equipment, the signal strength can be from about 80% to about 200%. Accordingly, there is preferably a sufficient amount of magnetic material in the toner to cause the imaged toner to have signal strength of about 100% or greater. Examples of preferred amounts of magnetic loadings are less than 28% by weight of the toner particles. More preferably, the magnetic loadings in the toner are from about 10% or less to about 24% by weight of the toner and even more preferably from about 16% to about 22% by weight of the toner. These amounts, especially the more preferred ranges, are significantly below magnetic loadings in commercially available magnetic MICR toners which use large amounts of magnetic loadings in order to achieve the necessary signal strengths for the released toner.

Besides the magnetic loading discussed above and the spacing agent, the remaining components of the magnetic toner particles as well as the hard magnetic carrier particles can be conventional ingredients. For instance, various resin materials can be optionally used as a coating on the hard magnetic carrier particles, such as fluorocarbon polymers like poly (tetrafluoro ethylene), poly(vinylidene fluoride) and polyvinylidene fluoride-co-tetrafluoroethlyene). Examples of suitable resin materials for the carrier particles include, but are not limited to, silicone resin, fluoropolymers, polyacrylics, polymethacrylics, copolymers thereof, and mixtures thereof, other commercially available coated carriers, and the like.

The toner particles can include one or more toner resins which can be optionally colored by one or more colorants by compounding the resin(s) with at least one colorant and any other ingredients. Although coloring is optional, normally a colorant is included and can be any of the materials mentioned in *Colour Index*, Volumes I and II, Second Edition, incorporated herein by reference. Carbon black is generally used in MICR toner particles. The amount of colorant can vary over a wide range, for instance, from about 3 to about 20 weight percent of the polymer and combinations of colorants may be used. The toner resin can be selected from a wide variety of materials including both natural and synthetic resins and modified natural resins as disclosed, for example, in U.S. Pat. Nos. 4,076,857; 3,938,992; 3,941,898; 5,057,392; 5,089,547; 5,102,765; 5,112,715; 5,147,747; 5,780,195 and the like, all incorporated herein by reference. Preferred resin or binder materials include polyesters and styrene-acrylic copolymers. The shape of the toner particles can be any shape, regular or irregular, such as spherical particles, which can be obtained by spray-drying a solution of the toner resin in a solvent. Alternatively, spherical particles can be prepared by the polymer bead swelling techniques, such as those described in European Patent No. 3905 published Sep. 5, 1979, which is incorporated in its entirety by reference herein.

With respect to the charge control agent, any conventional charge control agent can be used. Preferably, the charge control agent for negatively charging toners are metal salts of 3,5 ditert-butyl salicylic acid, and for positively charging toners, quaternary ammonium salts, such as TP 415 from Hodogaya. Specific examples include, but are not limited to, Orient Bontron E-84 and Hodogaya T-77 (iron chelate). As indicated above, the toner can also contain other components such as those described in U.S. Pat. Nos. 3,893,935; 5,358,814; 5,358,815; 5,358,816; 5,358,817; and 5,358,818 and British Patent No. 1,501,065, all incorporated herein by reference.

For purposes of the present invention, at least one wax is preferably present in the toner particles of the present invention. The wax is preferably present in an amount of from about 0.1 to about 10 wt % and more preferably in an amount of from about 1 to about 6 wt % based on the toner weight. Examples of suitable waxes include, but are not limited to, polyolefin waxes, such as low molecular weight polyethylene, polypropylene, copolymers thereof and mixtures thereof. Preferred waxes are waxes available from Baker Petrolite, such as Polywax 2000, Polywax 3000, and/or Unicid 700; and waxes from Sanyo such as Viscol 550P and/or Viscol 660P.

The carrier particles and toner developer mixtures can have various toner concentrations, such as from about 70 to 99 wt % carrier and from about 1 wt % to about 30 wt % toner, based on the total weight of the developer, and preferably from about 15 to about 25 wt % toner and more preferably from about 17 to about 20 wt % toner. The weight percent toner in the preferred developer compositions of the present invention are sufficiently higher than conventional developer compositions. Most conventional soft carrier MICR developers have approximately 1 to 5 wt % toner. The present invention permits excellent flow of the toner even at such high loadings of toner in the developer. With the high amount of toner present in the developer, high speed printing is easier without jeopardizing image quality.

The present invention further relates to the use of the above-described development system in developing electrostatic images with the magnetic toner of the present invention. The method involves contacting an electrostatic image with the magnetic toner of the present invention. For example, the method involves developing an electrostatic image member bearing an electrostatic image pattern by moving the image member through a development zone and transporting developer through the development zone in developing relation with the charge pattern of the moving imaging member by rotating an alternating-pole magnetic core of a pre-selected magnetic field strength within an outer non-magnetic shell, which can be rotating or stationary, and controlling the directions and speeds of the core and optionally the shell rotations so that developer flows through the development zone in a direction co-current with the image member movement, wherein an electrographic two-component dry developer composition is preferably used. The dry developer composition contains charged magnetic toner particles and oppositely charged carrier particles. The carrier particles are preferably a hard magnetic material exhibiting a coercivity of at least about 300 gauss when magnetically saturated and also exhibit an induced magnetic moment of at least about 20 EMU/gm when in an externally applied field of 1,000 gauss. The carrier particles have a sufficient magnetic moment to prevent the carrier particle from transferring to the electrostatic image. The various methods described in U.S. Pat. Nos. 4,473,029 and 4,546,060 can be used in the present invention using the magnetic toner of the present invention in the manners described herein, and these patents are incorporated in their entirety by reference herein.

The electrostatic image so developed can be formed by a number of methods such as by imagewise photodecay of a photoreceptor or imagewise application of a charge pattern on the surface of a dielectric recording element. When photoreceptors are used, such as in high-speed electrophotographic copy devices, the use of half-tone screening to modify an electrostatic image is particularly desirable; the combination of screening with development in accordance with the method of the present invention producing high-quality images exhibiting high Dmax and excellent tonal range. Representative screening methods include those employing photoreceptors with integral half-tone screen, such as those described in U.S. Pat. No. 4,385,823, incorporated in its entirety by reference herein.

Developers in the development system of the present invention are preferably capable of delivering toner to a charged image at high rates and hence are particularly suited to high-volume electrophotographic printing applications and copying applications.

Thus, with the present invention, due to the low amount of magnetic loading in the toner particles, the toner particles are easier to manufacture since magnetic particles in toners are quite difficult to disperse and to form into toner particles. Also, with the low magnetic loading in the toner particles, the toner particles are easier to fuse into an image. In addition, with a lower magnetic loading, the magnetic toner particles are easier to separate from the carrier particles and thus more toner reaches the charged image which provides excellent sharpness and/or good line quality. Furthermore, since more toner reaches the charged image, the magnetic strength is sufficient to provide the necessary signal strength for the released toner as indicated above. Finally, as indicated above, with the present invention, the above-described benefits, including faster printer speeds, are achieved with the magnetic toner particles of the present invention preferably in combination with the development system of the present invention compared to conventional magnetic toner particles.

As an alternative embodiment, instead of using a spacing agent on the magnetic toner particles, the transfer potential can be significantly increased such that the electrostatic forces associated with the charged image are quite high, such as from about 1,000 volts to about 2,500 so that these electrostatic charges are sufficient to strip the magnetic toner particles away from the carrier particles.

Another alternative way of using the development system of the present invention is to increase the speed of the rotating magnetic core which permits the shaking of the toner particles to such an extent that their stripping from the carrier particles is possible. The speed of the rotating core is at least about 100 rpm or at least about 500 rpm. With respect to this embodiment, the speed of the rotating magnetic core is at least about 1,000 rpm and can be at least about 2,000 rpm or at least about 2,500 rpm, and more preferably is from about 500 to about 2,500 rpm. These various embodiments described above can be used in various combinations as well.

An additional alternative way of using the development system of the present invention is to add an AC bias in superposition with the DC bias of the toning station. The AC bias agitates the toner particles so that the stripping of toner particles from carrier particles is enhanced. The AC bias waveform preferably has a frequency of from about 300 Hz to about 3000 Hz and peak-to-peak amplitudes of from about 0.2 kV to about 5 kV; and most preferably range from about 1000 to about 1500 Hz, with a 2–3 kV peak-to-peak. AC voltages having the form of a trapezoidal wave and most preferably a square wave are preferable to waveforms with lower average rms voltage, such as sine waves or triangle waves. The usefulness of AC bias as a means of enhancing image density and reducing undesirable side effects of toning in conjunction with toning stations having a rotating magnetic core is described in U.S. Pat. Nos. 5,376,492; 5,394,230; 5,409,791; 5,489,975; 5,606,404; and 5,985,499. All of the various embodiments described above can be used in various combinations as well.

The development system and the toner particles of the present invention preferably provide one or more of the following image quality attributes:

A Reflection Density of from about 1.1 to about 1.8, and preferably about 1.3;

A Background (RMSGS) of less than about 1.16 and preferably less than about 0.80;

A line width of from about 375 urn to about 400 um, and preferably about 390 um;

A crack width of less than about 100 um and preferably less than 50 um;

An improve resistance to rub-off of the image after one or more passes through a reader.

An intrack/crosstrack ratio of from about 0.80 to about 1.2, and preferably 1.0.

Preferably, the present invention obtains one or more of these attributes, and preferably at least 3 or 4 of these attributes, and most preferably, all of these attributes.

The present invention can be further clarified by the following examples, which are intended to be purely exemplary of the present invention.

EXAMPLES

Example 1

A MICR toner was made from the following components:

| Chemical | Trade name | Manufacturer | Weight % |
| --- | --- | --- | --- |
| Polyester resin | 5EXP | NexPress | 71.9% |
| Carbon Black | Black Pearls 430 | Cabot Corp | 5.8% |
| Polypropylene wax | Viscol 550P | Sanyo | 1.44% |
| Polyethylene wax | Unicid 700 | Petrolite | 1.44% |

-continued

| Chemical | Trade name | Manufacturer | Weight % |
|---|---|---|---|
| Iron oxide | Magnox B-XT-2552 | Magnox | 18.0% |
| Iron organic chealate charge agent | T77 | Hodogaya | 1.44% |

The components were dry powder blended in a 40 liter Henschel mixer for 60 seconds at 1000 RPM to produce a homogeneous blend.

The powder blend was then melt compounded in a twin screw co-rotating extruder to melt the polymer binder and disperse the pigments, charge agents, and waxes. Melt compounding was done at a temperature of 230° F. at the extruder inlet, 230° F. increasing to 385° F. in the extruder compounding zones, and 385° F. at the extruder die outlet. The processing conditions were a powder blend feed rate of 10 kg/hr and an extruder screw speed of 490 RPM. The cooled extrudate was then chopped to approximately ⅛ inch size granules.

After melt compounding, the granules were then fine ground in an air jet mill to a particle size of 11 micron median, volume weighted, diameter. The toner particle size distribution was measured with a Coulter Counter Multisizer. The fine ground toner was then classified in a centrifugal air classifier to remove very small toner particles and toner fines that were not desired in the finished toner. After classification to remove fine particles, the toner had a particle size distribution with a width, expressed as the diameter at the 50% percentile/diameter at the 16% percentile of the cumulative particle number versus particle diameter, of 1.30 to 1.35.

The classified toner was then surface treated with fumed silica. A hyrdophobic silica, designated R972, and manufactured by Nippon Aerosil was used. 2000 grams of toner were mixed with 10 grams of silica to give a product containing 0.5 weight percent silica. The toner and silica were mixed in a 10 liter Henschel mixer with a 4 element impeller for 2 minutes at 2000 RPM.

The silica surface treated toner was sieved through a 230 mesh vibratory sieve to remove un-dispersed silica agglomerates and any toner flakes that may have formed during the surface treatment process.

Example 2

The toner in this example, prepared as above and designated 9834-8, consisted of a polyester binder with 18% by weight $Fe_3O_4$, carbon black as a colorant, waxes for release from the fusing roller, no charge agent, and a silica particle surface treatment. The carrier was strontium ferrite, magnetized to 400 gauss and sieved. The two part developer was made by weighing out toner and carrier and then mixing them together by hand in a container. The resulting developer was then installed in the rotating magnetic core toning station of a printing machine substantially like the Digisource 9110 printer.

This material was use to make 10,000 prints of various image types with data being taken as the test progressed. At the end of this 10,000 print run, additional setpoints were used to identify the useful setpoint conditions which result in both good visual appearance and acceptable magnetic performance.

FIG. 1 shows the performance of this toner in two critical dimensions, i.e. reflective solid area density and average magnetic signal strength as measured by a MICR QUALIFIER, a diagnostic check reader manufactured by the RDM Corporation of Waterloo, Ontario, Canada. The box marked "AIM" represents values for average signal strength and reflection density which are considered to be preferably magnetically useful and visually pleasing. The data for the toner in example 2 indicates a good balance between magnetic performance and visual image quality.

Example 3

Toner for example 3 was prepared as above with 30% $Fe_3O_4$ by weight. The developer was the same as for example 2. The experimental run followed the same pattern as in example 2.

This data is plotted in FIG. 1 and shows the effect of a higher level of $Fe_3O_4$. The signal strength is higher in general than Example 2.

Example 4

Toner for example 4 was prepared as above with 14% $Fe_3O_4$ by weight. The developer was the same as for example 2. The experimental run followed the same pattern as in example 2.

This data is plotted in FIG. 1 and shows the effect of a lower level of $Fe_3O_4$. The signal strength is lower than Example 2.

Example 5

Toner for example 5 was prepared as above with 18% $Fe_3O_4$ by weight but it was not surface treated. The developer was otherwise the same as for example 2. The experimental run followed the same pattern as in example 2.

This data is plotted in FIG. 1 and shows the effect of no surface treatment. While this shows some data still in the aim box, the electrophotographic setpoints required to maintain adequate image quality are more restrictive than with other materials tested.

Example 6

Toner for example 6 was prepared as above with 18% $Fe_3O_4$ by weight but it was not surface treated. The developer was otherwise the same as for example 2. The experimental run differed from that used in example 2 in that the toning station shaft speeds were varied to see the effects of core magnet and shell RPM on the image quality and magnetic strength of the resulting image.

This data is plotted in FIG. 1 and shows the effect of no surface treatment with variations in magnet core RPM. While this shows some data still in the aim box, the electrophotographic setpoints required to maintain adequate image quality are more restrictive than with other materials tested.

Finally, FIGS. 2a, 2b, 3a, and 3b are SEM photographs showing some toners of the present invention at magnifications of 5,000 and 10,000.

The toner in FIG. 2 was prepared as in Example 1 using 0.15 wt % silica and blended for 2 minutes at 2,000 RPM in the mixture.

The toner in FIG. 3 was prepared as in Example 1 using 0.15 wt % to silica and blended for 10 minutes at 3,900 RPM. Surface analysis showed that the toner of FIG. 2 had 2.98 atomic % silica while the toner of FIG. 3 had 1.58 atomic % silica.

Figure 4:
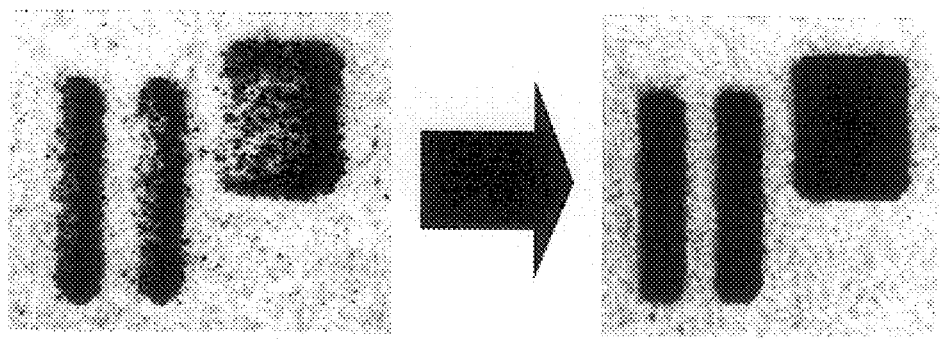
FIG. 4 shows two magnified photographs of images printed with MICR toner with surface treatment and without surface treatment.

FIG. 4 is a photograph of images produced with surface treatment and without surface treatment. The toner (with no surface treatment) had no spacing agent but otherwise had substantially the same components and was printed on printers like the Digisource 9110 printer. The differences in image were dramatic. The image printed with the toner of the present invention (right image) was sharper and darker than the image printed with toner having no surface treatment (left image).

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A MICR developer comprising magnetic toner particles having a magnetic loading of less than 28% by weight, based on the weight of the toner and hard magnetic carrier particles.

2. The developer of claim 1, wherein said magnetic loading is less than 24% by weight.

3. The developer of claim 1, wherein said magnetic loading is from about 10% to about 24% by weight.

4. The developer of claim 1, wherein said magnetic loading is from about 16% to about 22% by weight.

5. A MICR developer comprising hard magnetic carrier particles and magnetic toner particles comprising at least one magnetic additive, at least one resin, at least one charge agent, and optionally, at least one colorant, wherein said magnetic toner particles have a spacing agent located on the surface of said magnetic toner particles.

6. The MICR developer of claim 5, wherein said spacing agent comprises silica.

7. The MICR developer of claim 5, wherein said spacing agent comprises at least one metal oxide.

8. The MICR developer of claim 5, wherein said spacing agent comprises at least one inorganic oxide.

9. The MICR developer of claim 5, wherein said spacing agent comprises at least one polymeric material.

10. The MICR developer of claim 5, wherein said spacing agent comprises acrylic polymer, silicone-based polymer, styrenic polymer, fluoropolymer, or mixtures thereof.

11. The MICR developer of claim 5, wherein said spacing agent is present in an amount of from about 0.05 to about 1.5 wt %, based on the weight of the toner.

12. The MICR developer of claim 5, wherein said spacing agent is present in an amount of from about 0.1 to about 1.0 wt %, based on the weight of the toner.

13. The MICR developer of claim 5, wherein said spacing agent is present in an amount of from about 0.2 to about 0.6 wt %, based on the weight of the toner.

14. The MICR developer of claim 5, further comprising at least one wax.

15. The MICR developer of claim 14, wherein said wax comprises polyolefin wax.

* * * * *